United States Patent
Joos et al.

(10) Patent No.: US 11,048,281 B2
(45) Date of Patent: Jun. 29, 2021

(54) REAL-TIME CAPABLE CONTROL STRATEGY FOR HYDRAULIC SYSTEMS WHILE SYSTEMATICALLY TAKING INTO CONSIDERATION CONTROL (RATE) AND STATE VARIABLE CONSTRAINTS

(71) Applicant: Robert Bosch GmbH, Stuttgart (DE)

(72) Inventors: Steffen Joos, Walheim (DE); Matthias Bitzer, Stuttgart (DE); Knut Graichen, Heroldsberg (DE); Michael Hilsch, Gaertringen (DE); Adrian Trachte, Stuttgart (DE); Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 16/432,220

(22) Filed: Jun. 5, 2019

(65) Prior Publication Data

US 2019/0377371 A1    Dec. 12, 2019

(30) Foreign Application Priority Data

Jun. 12, 2018 (DE) .................. 10 2018 114 047.9
Jul. 13, 2018 (DE) .................. 10 2018 211 738.1

(51) Int. Cl.
*G05D 16/20* (2006.01)
*F15B 13/044* (2006.01)
*G05B 13/04* (2006.01)

(52) U.S. Cl.
CPC ....... *G05D 16/2013* (2013.01); *F15B 13/044* (2013.01); *G05B 13/042* (2013.01); *F15B 2211/7051* (2013.01)

(58) Field of Classification Search
CPC .......... F15B 13/044; F15B 2211/7051; G05D 16/2013; G05B 13/042
USPC .......................................... 700/29
See application file for complete search history.

(56) References Cited

U.S. PATENT DOCUMENTS

| | | | |
|---|---|---|---|
| 4,198,017 A * | 4/1980 | Murray | G05D 1/0816 244/17.13 |
| 8,904,560 B2 * | 12/2014 | Shi | B82Y 35/00 850/11 |
| 2005/0267609 A1 * | 12/2005 | Van Donkelaar | G05B 21/02 700/45 |
| 2008/0237517 A1 * | 10/2008 | Krupadanam | F02D 11/10 251/129.01 |
| 2012/0016561 A1 * | 1/2012 | Pinte | F16D 48/066 701/68 |

* cited by examiner

*Primary Examiner* — Jigneshkumar C Patel
(74) *Attorney, Agent, or Firm* — Maginot, Moore & Beck LLP

(57) ABSTRACT

The invention relates to a method for generating a control variable trajectory for an actuator so as to influence an input variable of a system, wherein a set point is supplied to the output variable of the system of a trajectory planning procedure, which from the set point generates a trajectory of constrained input values for a filter integrator chain and a trajectory of flat desired states, wherein the trajectory of constrained input values and the trajectory of flat desired states are supplied to a flatness-based feedforward control procedure that generates therefrom the control variable trajectory for the actuator, wherein in the trajectory planning procedure so as to generate the trajectory of constrained input values at least one constraint is applied in dependence upon the trajectory of flat desired states.

11 Claims, 3 Drawing Sheets

REAL-TIME CAPABLE CONTROL STRATEGY FOR HYDRAULIC SYSTEMS WHILE SYSTEMATICALLY TAKING INTO CONSIDERATION CONTROL (RATE) AND STATE VARIABLE CONSTRAINTS

This application claims priority under 35 U.S.C. § 119 to application no. DE 10 2018 114 047.9, filed on Jun. 12, 2018 in Germany, and to application no. DE 10 2018 211 738.1, filed on Jul. 13, 2018 in Germany, the disclosures of which are incorporated herein by reference in its entirety.

TECHNICAL FIELD

The present invention relates to a method for generating a control variable trajectory for an actuator, in particular of an electrically controllable proportional valve of a hydraulic system, so as to influence an output variable of a system.

BACKGROUND

Hydraulic systems typically comprise inter alia components such as pumps and valves. These components are subject to physical constraints. Thus, by way of example in the case of a solenoid valve (in other words an electrically controllable solenoid valve), inter alia the control current of the valve and also the position of the valve spool are constrained. These constraints may be formed in a model as state and control variable constraints. For the synthesis of real-time capable control technology structures, such as feedback control units or feedforward controllers, such as are required in particular in the case of an operation via a joystick or gas pedal, the systematic maintenance of constraints is a challenge.

One possibility of systematically taking into consideration constraints in a control procedure is to use the model-predictive feedback control or control method (MPC) which furthermore renders it possible to control the hydraulic system in an optimum manner with respect to a defined performance function. However, MPC has the disadvantage that in each iteration step it is necessary to numerically solve an optimization problem during the running time. This requires either correspondingly fast and expensive (digital) hardware components or a solution approach that is tailored to suit the specific MPC problem, this represents a correspondingly high outlay with regard to development and implementation.

In order to avoid these disadvantages, it is possible so as to control hydraulic systems in a real-time capable manner to use in lieu of an MPC method a flatness-based feedforward control procedure with a corresponding trajectory planning procedure. So as to realize the (non-linear) flatness-based feedforward control procedure (continuously differentiable) trajectories for the flat output and its time derivatives are required. These trajectories must be planned in real time in dependence upon an a-priori unknown (provided by the user) reference value for the variable that is to be controlled. A deep pass filter algorithm, a so-called "state variable filter", may be used for this purpose. This has the disadvantage that it is not systematically possible in the trajectory planning procedure to take into consideration physical and geometrical constraints and therefore a trajectory is generated that is either not realizable or is suboptimal, in other words is conservative.

SUMMARY

The invention proposes a method for generating a state variable trajectory for an actuator, in particular for an electrically controllable proportional valve of a hydraulic system, so as to influence an output variable of a system, and the invention also proposes a computing unit and a computer program for implementing said method having the features of the independent claims. Advantageous embodiments are the subject matter of subordinate claims and the description below.

The invention describes a general approach for the real-time trajectory planning procedure while taking into consideration control and state variable constraints for non-linear single-variable systems of any order. The core of the invention is an expanded deep pass filter algorithm which renders it possible to plan a trajectory in real time and in particular takes into consideration the non-linear (flat) dynamics of single-variable systems and also control variable constraints and (polytopic) constraints of the flat state without numerical real-time optimization. The essential change in comparison to a conventional state variable filter resides in the structural expansion of the filter algorithm by a dynamic constraint of the input of the filter integrator chain so as to take into consideration the control and state variable constraints. In this case, the formulation, parameterization and prioritization of the individual dynamic limits are of particular importance.

In principal, the invention may be used in general for any problems when planning trajectories, where the controlled system may be modelled as a non-linear (input-affine) single-variable system with control (rate) and state variable constraints. In particular, the described approach may be used for hydraulic systems having mechanical stops, such as occur in the case of valves. By way of example, the invention may be used for adjusting the pivot angle of any axial piston machines in an inclined axle or pivot disc construction having EP adjustment. In this case, the angle adjustment of the axle or disc is performed in an electro proportional manner (EP adjustment), wherein the angle is predetermined by means of the control current of a proportional directional valve. One exemplary application is the use for vehicles having in part or complete hydraulic power transfer via axial piston machines.

The invention renders it possible by virtue of a corresponding feedforward control procedure to bring such a hydraulic system as quickly as possible to a (in real time) predetermined working point. Simultaneously, the constraints of the hydraulic system are maintained at any point in time (in particular in the transients). In particular, in addition to the control variable constraint (for example constraint of the control current) the constraint of the system states (for example the valve spool position and the piston position) are systematically taken into consideration in the calculation of the control trajectory. This has the advantage that it is possible to calculate an achievable trajectory that is close to (or at) the constraint or rather the maximum possible adjustment speed. Moreover, safety limits may be formed and maintained systematically via state constraints. A further important advantage is the possibility of influencing how hard or soft the trajectory is planned into the state constraints. Thus, it is possible by way of example to avoid hard stops which depending upon the application may considerably reduce the component wear (for example of valves). Furthermore it is advantageous that the constrained trajectory (in the case of a sufficiently precise feedforward control procedure) provides realistic information regarding the prevailing system state. This information may be used by way of example for higher ranking diagnostic functions so long as it is ensured that the axial piston machine is operating in an error-free manner. The outlay for real-time computing of the feedforward control concept that is used is very low in this case and in particular it does not need numerical real-time optimization.

A computing unit in accordance with the invention, for example a control unit of a valve, is in particular configured as far as the program technology is concerned so as to implement a method in accordance with the invention. Also, the implementation of the method in the form of a computer program is advantageous since this results in particularly low costs, in particular if a control unit that implements said method is also used for other tasks and therefore is already provided. Suitable data carriers for providing the computer program are in particular magnetic, optical and electrical storage devices, such for example hard drives, flash storage devices, EEPROMs, DVDs inter alia. It is also possible to download a program via computer networks (Internet, Intranet etc.).

Further advantages and embodiments of the invention are evident in the description and the attached drawing.

It goes without saying that the above mentioned features and the features that are still to be explained below may be used not only in the respective described combination but rather also in other combinations or as standalone, without abandoning the scope of the invention.

BRIEF DESCRIPTION OF THE DRAWINGS

The invention is illustrated schematically in the drawing with reference to an exemplary embodiment and is described in detail below with the aid of the drawing.

In the drawings.

DETAILED DESCRIPTION

The invention describes a general approach for the real-time trajectory planning procedure while taking into consideration control and state variable constraints for non-linear single-variable systems of any order. The new approach is suitable in particular for hydraulic systems and is used in an exemplary manner to control an inclined disc axial piston machine (AKM), such as for example in accordance with the invention DE102015224650A1.

Figure 1:
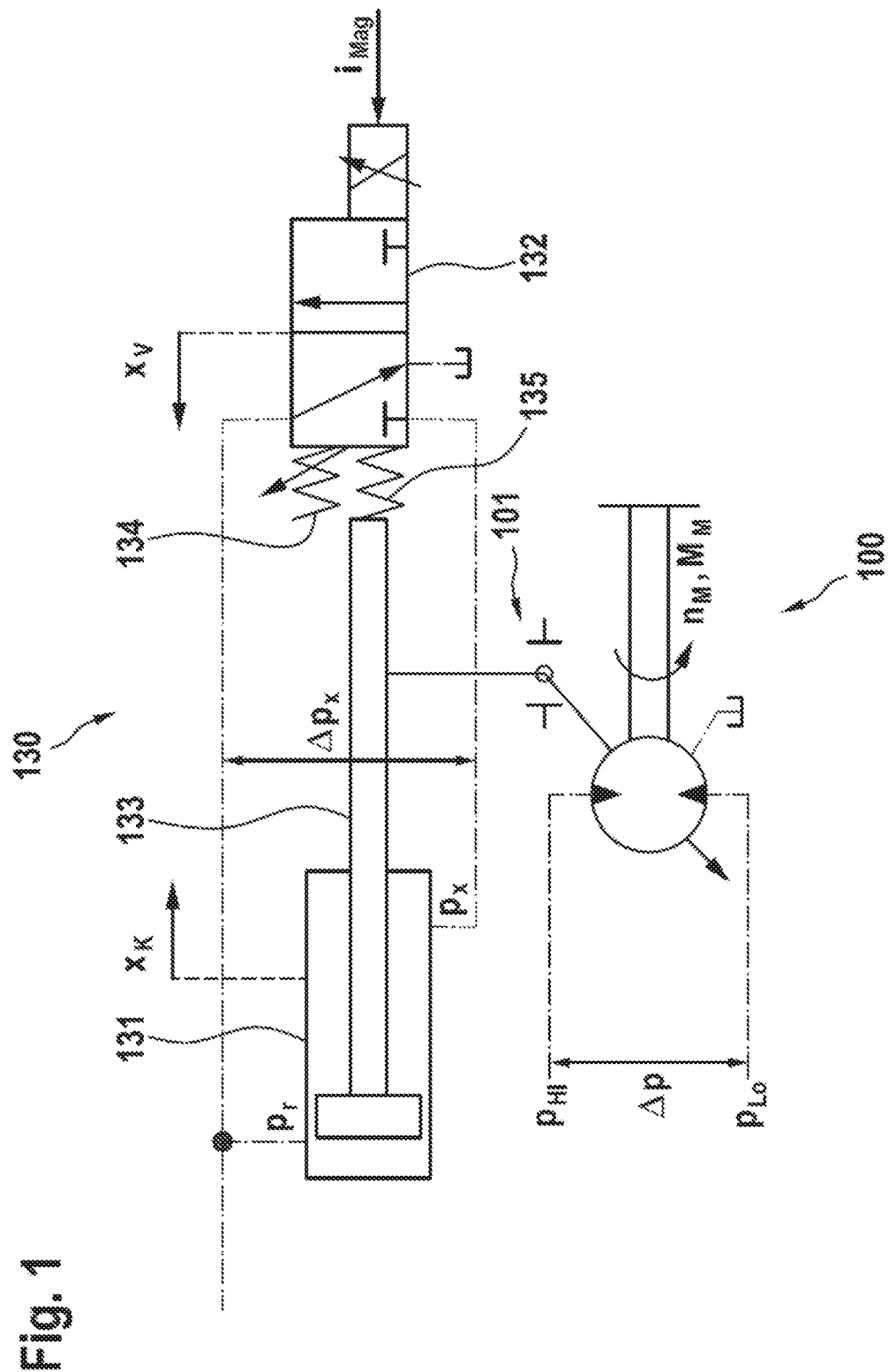
FIG. 1 illustrates schematically an adjustment mechanism for an axial piston machine with which a method in accordance with the invention may be performed.

FIG. 1 illustrates schematically an adjusting unit 130 for an axial piston machine 100, by way of example in an inclined disc or inclined axle construction. A pivot angle of the axial piston machine may be adjusted by means of the adjusting unit 130, wherein it is possible to adjust the delivery volume or displacement volume via the adjustment of the pivot angle. The axial piston machine 100 may be operated both as a motor and also as a pump having a rotation speed $n_M$ and a torque $M_M$. The axial piston machine is connected to a high pressure side $p_{Hi}$ and a low pressure side $p_{Lo}$ and is subjected to a pressure difference $\Delta_p$.

The pivot angle may be adjusted using the adjusting unit 130. The adjusting unit 130 includes in this case an adjustment cylinder 131 that engages with its piston 133 by way of example at a pivot cradle 101 of the axial piston machine 100. A position of the piston is identified by $x_K$. The piston is subjected to a pressure difference $\Delta p_x = |p_r - p_x|$ that may be adjusted using an electro proportional valve 132. The position $x_K$ of the piston 133 in the adjustment cylinder 131 represents the output variable of the system.

The adjusting unit 130 includes furthermore the electro proportional valve 132 having a coil or rather an electro magnet that is supplied with a current $i_{Mag}$ and a return spring 134 that is used to change a valve spool position $x_v$. A coupling spring 135 produces a return movement of the piston position to the valve spool position.

Figure 2:
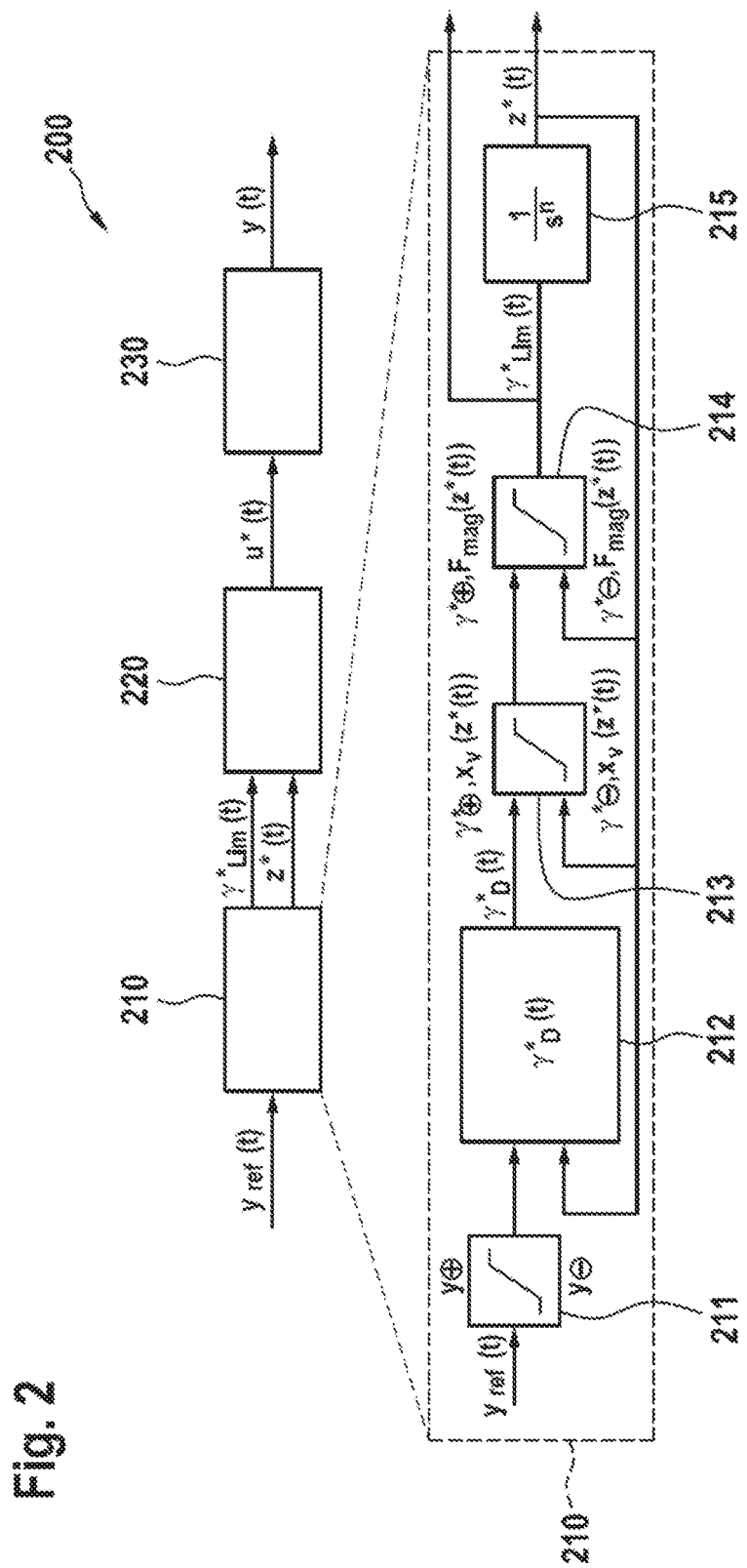
FIG. 2 illustrates a principle structure of the flatness-based feedforward control procedure in combination with the expanded trajectory planning procedure for the real-time capable control of hydraulic systems using the example of controlling the piston position of an axial piston machine.

For an axial piston machine, an electronic pivot angle feedback control unit that is superimposed with a mechanical control loop for the EP adjustment is configured as illustrated in principle by way of example in FIG. 2. As a consequence, an improvement is achieved in the adjusting speed and the robustness is increased with respect to interference factors, parameter fluctuations of the system and deviations in the EP characteristic curve.

A model-based feedback control unit design is used in a structure of two degrees of freedom for the superimposed pivot angle feedback control procedure. A flat-based feedforward control procedure 220 takes into consideration the EP adjustment and the superimposed mechanical control loop. An additional (optional) error feedback control unit (not illustrated) compensates for interferences and parameter irregularities.

The essential dynamics of the AKM is the piston position $x_k$ that is controllable via the control current $I = i_{Mag}$ and can be described in a simplified manner via a non-linear model with the flat state $$z \in \square^n$$

where n=2
in accordance with $$\dot{z} = \dot{z}_1 = z_2 = \dot{x}_k \tag{1a}$$

$$\ddot{z} = \dot{z}_2 = -\alpha_{const} \cdot \frac{\beta_{const}}{\sqrt{|p_r - p_x|}} \cdot A_v(|x_v|) \cdot \dot{z} + \tag{1b}$$

$$\alpha_{const} \cdot \theta_{const} \cdot \sqrt{|p_r - p_x|} \cdot \frac{dA_v(|x_v|)}{dx_v} \cdot$$

$$[F_{mag}(I) - F_{jet}(x_v, p_x) - c_F \cdot (l_0 + x_v) - c_{F1} \cdot (l_{01} + x_v + z)]$$

$c_F$ represents the spring stiffness of the return spring, $l_0$ the spring pretension converted in the adjustment path, $l_{01}$ represents the spring pretension of the coupling spring converted into the adjustment path.

In this case, the system dynamics (1b) of the opening area $A_v(|x_v|)$ of the valve in dependence upon the value of the valve tappet position $|x_v|$ and dependent upon its temporal change, which as the flow forces $F_{jet}$, which subsequently act on the valve, may be applied by way of example across non-linear functional relationships or characteristic fields.

In particular, a characteristic field may be stretched across the opening area $A_v$ of the valve [in mm$^2$] and the piston position $x_k$ [in mm], wherein the relationship may be by way of example measured or calculated across the opening geometry.

The flow force $F_{jet}$ may be calculated by way of example via the equation $F_{jet}(x_v, p_x) = 2\alpha_v k_{jet} \cos(\varphi_{jet}) A_v(x_v) \Delta p_x$ with the orifice coefficient $\alpha_v$, the correction factor $k_{jet}$ and the inflow angle $\varphi_{jet}$ (depending upon the construction).

Furthermore, in addition to the constants $\alpha_{const}$, $\beta_{const}$ and $\theta_{const}$ the coupling spring and return spring and also the pressure difference $\Delta p_x$ have a direct influence on (1b) via the valve.

$$\alpha_{const} = \left(\frac{A_{kA}}{\alpha_V} \cdot \sqrt{\frac{\rho_x}{2}}\right)^{-1},$$

$$\beta_{const} = \frac{c_{F1}}{2A_{kA}},$$

$$\theta_{const} = \frac{1}{d_V}$$

$C_{F1}$ represents the spring stiffness of the coupling spring, $A_{kA}$ represents the pressure-effective piston surface in the adjustment cylinder, $p_x$ represents the oil density and $d_v$ represents the damping and accordingly the viscose friction coefficient.

In precise system theory terms, the pivot angle is the actual output y and the piston position $x_k$ is the flat output z. However in a good approximation, the pivot angle corresponds to the piston position. Since consequently the actual output $y=z=z_1=x_k$ is identical to the flat output z, there is no zero dynamics in the model. However, it is also possible to use the invention if there is a stable zero dynamics. In this case, it is necessary to solve a stable differential equation in order to re-plan the command variable from y to z.

The control variable u of the reduced model (1) represents the magnetic force $F_{mag}$ in the valve which may be expressed for example with the aid of a function or via a characteristic field in dependence upon the actual control variable, the control current I and accordingly the control voltage U.

The position $x_v$ of the valve spool may be calculated by way of example by virtue of solving the non-linear equation $$\dot{z} = \alpha_{const} \cdot A_v(|x_v|) \cdot \text{sign}(p_r - p_x) \cdot \sqrt{|p_r - p_x|}. \quad (2)$$

in dependence upon the flat state z.

A dynamic feedforward control procedure for the AKM may be indicated by way of example directly from the inversion of (1b). The trajectories that are required so as to achieve this feedforward control procedure may be generated with the aid of a state variable filter (ZVF) and accordingly a trajectory planner 210 that may be implemented by way of example as a delay element of the $n^{th}$ order. The dynamics of the ZVF may be predetermined by way of example via a filter time constant. The ZVF is considered in the controllable canonical form for the subsequent considerations. In order to be able to maintain constraints by virtue of controlling the AKM, it is necessary to take these constraints into consideration in the planned trajectories. For this purpose, the ZVF is structurally expanded (in the controllable canonical form). To be more precise, the input of the filter integrator chain 215 is dynamically constrained (cf. FIG. 2). For this purpose, a constraint characteristic curve element 211, 213, 214 is implemented for each constraint. In this case, the sequence of cascaded constraint characteristic curve elements determines the prioritization of the individual constraints.

The integrator chain 215 comprises a number n of integrators in order to obtain the flat output z* (cf. also 9a) (i.e. the trajectory of the flat desired states) from the constrained (n)-derivative $\gamma^*_{Lim}(t)$ (n being the order of the system) by virtue of n-times upward integration. In this case, it is the set point $y_{ref}(t)$ for the flat output (and its time derivatives) that are required for realizing the flat feedforward control procedure (8).

Typically, control variable constraints are awarded the highest priority (in other words the corresponding constraint characteristic curve element 214 is placed at the last position) in order to guarantee that it is possible to realize the feedforward signal by means of the actuator.

The limits of the individual constraint characteristic curve elements are formulated below in an exemplary manner for the example of the AKM and may be used in general for any (hydraulic) systems with constraints.

So as to take into consideration (214) the constraints of the control current $I_{min} \leq I \leq I_{max}$, these are initially formulated as constraints of the magnetic force $F_{mag,min}(I_{min}) \leq F_{mag} \leq F_{mag,max}(I_{max})$. In order to flatten the control variable $u = F_{mag}$ into saturation, the trajectory is planned in accordance with the system dynamics (1b) that are suggested with the limit values for the control variable. This results in the dynamic limits $$\gamma_{\ominus,F_{Mag}}(z, F_{mag,min}(I_{min})) = -\alpha_{const} \cdot \frac{\beta_{const}}{\sqrt{|p_r - p_x|}} \cdot A_v(|x_v|) \cdot \dot{z} + \quad (3a)$$

$$\alpha_{const} \cdot \theta_{const} \cdot \sqrt{|p_r - p_x|} \cdot \frac{dA_v(|x_v|)}{dx_v} \cdot$$

$$[F_{mag,min}(I_{min}) - F_{jet}(x_v, p_x) - c_F \cdot (l_0 + x_v) - c_{F1} \cdot (l_{01} + x_v + z)],$$

$$\gamma_{\oplus,F_{Mag}}(z, F_{mag,max}(I_{max})) = -\alpha_{const} \cdot \frac{\beta_{const}}{\sqrt{|p_r - p_x|}} \cdot A_v(|x_v|) \cdot \dot{z} + \quad (3b)$$

$$\alpha_{const} \cdot \theta_{const} \cdot \sqrt{|p_r - p_x|} \cdot \frac{dA_v(|x_v|)}{dx_v} \cdot [F_{mag,max}(I_{max}) -$$

$$F_{jet}(x_v, p_x) - c_F \cdot (l_0 + x_v) - c_{F1} \cdot (l_{01} + x_v + z)].$$

The geometric constraint of the piston position $x_{k,min} \leq x_k \leq x_{k,max}$, in other words the constraint in dependence upon a control range of the actuator, may be directly incorporated (211) into the trajectory planning procedure as a state constraint via a constraint of the reference in accordance with $$y_{\ominus} = x_{k,min} \leq x_{k,ref} \leq x_{k,max} = y_{\oplus} \quad (4)$$

The position constraint of the valve spool $x_{v,min} \leq x_v \leq x_{v,max}$ is taken into consideration (213) in the trajectory planning procedure as a state constraint in such a manner that the trajectory for $x_v$ is planned into saturation. For this purpose, the dynamic limits are configured as a closed-loop control rule for $\dot{z} = z_2$ so as to ensure the constraint is maintained $$\gamma_{\ominus,x_v}(z, x_{v,min}) = \quad (5a)$$

$$r_{\ominus,x_{v,min}} \cdot \left(\frac{\alpha_{const} \cdot A_v(|x_{v,min}|) \cdot \text{sign}(p_r - p_x) \cdot \sqrt{|p_r - p_x|}}{z_{2,\ominus,ref}} - z_2\right),$$

$$\gamma_{\oplus,x_v}(z, x_{v,max}) = \quad (5b)$$

$$r_{\oplus,x_{v,max}} \cdot \left(\frac{\alpha_{const} \cdot A_v(|x_{v,max}|) \cdot \text{sign}(p_r - p_x) \cdot \sqrt{|p_r - p_x|}}{z_{2,\oplus,ref}} - z_2\right).$$

The (time variant) set points $z_{2,\ominus,ref}$ or $z_{2,\oplus,ref}$ are produced in this case with the aid of the non-linear equation (2) and the corresponding state constraint. It is possible using the tuning parameter $r_{\ominus,x_{v,min}}$ or $r_{\oplus,x_{v,max}}$ to influence how hard or soft the trajectory is planned into the stop. This parameter is to be set specifically for each application in dependence upon the type of constraint and also upon the available control variable reserve.

Figure 3:
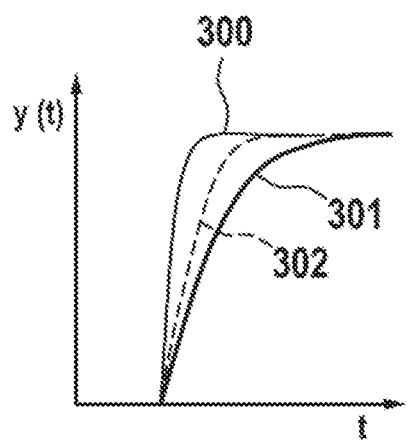
FIG. 3 illustrates qualitative comparisons of different trajectories for the variable y that is to be controlled, an internal constrained system state x and also the control variable u.
Figure 3:
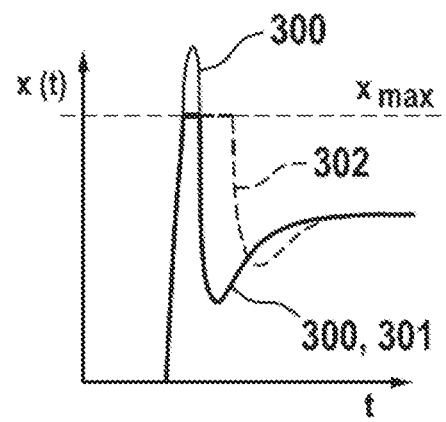
Figure 3:
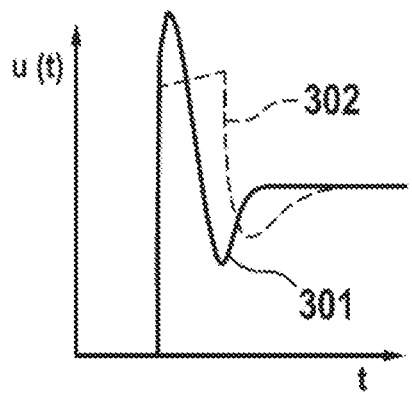

The qualitative progression of the constrained control procedure and the associated behavior of the controlled hydraulic system (AKM) in comparison to its behavior in the case of an unconstrained control procedure is illustrated in FIG. 3 which illustrates a qualitative comparison of different trajectories for the variable y that is to be controlled, an internal constrained system state x and also the control variable u, in each case over the time t. If a constrained (hydraulic) system on the basis of the unconstrained reference trajectory 300 is not in accordance with the invention then the progression 301 is measured on the system. The system may not follow the reference trajectory precisely owing to the constraints that are not taken into consideration. In comparison thereto, the control trajectory 302 that is (optimally) constrained by the invention (and which may be realized by the system) is considerably closer to the reference 300 for the controlled variable y.

Transferability to Constrained Trajectory Planning Problems for Non-Linear Input-Affine Single Variable Systems A non-linear minimal-phase input-affine single variable system is considered below $$\dot{x} = f(x) + g(x) \cdot u, t > 0, x(0) = x_0 \quad (6a)$$

$$y = h(x), t \geq 0 \quad (6b)$$

with the state $x \in \square^n$, the control variable $u \in \square$, and also the system output $y \in \square$. It is assumed that for the system (6) a flat output $z(t) = p(x)$ and a diffeomorphism exist $$z = \phi(x) = [\rho(x), \mathcal{L}_f \rho(x), \ldots, \mathcal{L}_f^{r-1} \rho(x)]^T, \quad (7)$$

so that it is possible to design a flatness-based feedforward control procedure $$u^* = \frac{1}{\mathcal{L}_g \mathcal{L}_f^{n-1} \rho \circ \phi^{-1}(z^*)} \cdot (\dot{z}_n^* - \mathcal{L}_f^n \rho \circ \phi^{-1}(z^*)). \quad (8)$$

by means of model inversion of (6). In so doing $\mathcal{L}$ defines the Lie derivative.

In order to plan continuously differentiable desired trajectories for the feedforward control procedure, a state variable filter is used $$\dot{z}_i^*(t) = z_{i+1}^*(t), i = 1, \ldots, n-1 \quad (9a)$$

$$\dot{z}_n^*(t) = \gamma_D^*(z^*, w_z) := a_F^T \cdot z^*(t) + \frac{1}{\tau^n} \cdot w_z(t) \quad (9b)$$

the dynamics of which may be set for example using $$a_F^T = \left[ \binom{n}{0} \cdot \frac{1}{\tau^n}, \binom{n}{1} \cdot \frac{1}{\tau^{(n-1)}}, \ldots, \binom{n}{n-1} \cdot \frac{1}{\tau} \right] \quad (9c)$$

with reference to the filter time constant $\tau$.

In the presence of (stable) zero dynamics, the reference for the output y must be re-planned to a reference for the flat output z by virtue of solving the differential equation $$w_y = h \circ \phi^{-1}(z^*) = \Psi_y(z^*, \dot{z}^*, \ldots, \overset{(n-r)}{z^*}) \quad (10)$$

It is possible in the trajectory planning procedure for the flatness-based feedforward control procedure to take into consideration in principle polytopic constraints of the flat state $$c_{z,k}(z) := f_{z,k}^T \cdot z - g_{z,k} \leq 0, k = 1, \ldots, n_c, \quad (11)$$

control variable constraints $$c_u(u(t)) := \begin{bmatrix} u_{min} - u(t) \\ u(t) - u_{max} \end{bmatrix} \leq 0, \quad (12)$$

and control rate constraints $$c_{\dot{u}}(\dot{u}(t)) := \begin{bmatrix} \dot{u}_{min} - \dot{u}(t) \\ \dot{u}(t) - \dot{u}_{max} \end{bmatrix} \leq 0 \quad (13)$$

The control rate may be described using an actuator model, for example via $$\dot{u}(t) = -\frac{1}{\tau_{Act}} \cdot u(t) + \frac{1}{\tau_{Act}} \cdot v(t), \quad (14)$$

$$t > 0, u(0) = u_0$$

with the actuator time constant $\tau_{Act}$. So as to take into consideration the constraints in the planning procedure, the input of the filter integrator chain (9a) is dynamically constrained (cf. also (212, 213, 214) in FIG. 2).

For this purpose, a constraint characteristic curve element is implemented for each constraint type (for example control rate constraint, control variable constraint, constraint of the state with relative degree r), the serial sequence of which determines the prioritization. The following applies: the closer the constraint characteristic curve element is placed to the integrator chain input, the higher is its priority.

The individual dynamic limits of the constraints may be described as above using the example of the axial piston machine. In detail, the following limits apply for control variable constraints $$\gamma_{\ominus,in}(z(t)) = \mathcal{L}_f^n \rho \circ \phi^{-1}(z) + \mathcal{L}_g \mathcal{L}_f^{n-1} \rho \circ \phi^{-1}(z) \cdot u_{min}, \quad (15a)$$

$$\gamma_{\oplus,in}(z(t)) = \mathcal{L}_f^n \rho \circ \phi^{-1}(z) + \mathcal{L}_g \mathcal{L}_f^{n-1} \rho \circ \phi^{-1}(z) \cdot u_{max}. \quad (15b)$$

and for the control rate constraints the following limits apply $$\gamma_{\ominus,ra}(t) = \mathcal{L}_f^n \rho \circ \phi^{-1}(z) + \quad (16a)$$
$$e_n^T \cdot \phi^{-1}(z) \cdot \mathcal{L}_g \mathcal{L}_f^{n-1} \rho \circ \phi^{-1}(z) + \mathcal{L}_g \mathcal{L}_f^{n-1} \rho \circ \phi^{-1}(z) \cdot \tau_{Act} \cdot \dot{u}_{min},$$

$$\gamma_{\oplus,ra}(t) = \mathcal{L}_f^n \rho \circ \phi^{-1}(z) + \quad (16b)$$
$$e_n^T \cdot \phi^{-1}(z) \cdot \mathcal{L}_g \mathcal{L}_f^{n-1} \rho \circ \phi^{-1}(z) + \mathcal{L}_g \mathcal{L}_f^{n-1} \rho \circ \phi^{-1}(z) \cdot \tau_{Act} \cdot \dot{u}_{max}.$$

In this case, the limits (16) are not designed solely with reference to the distance model (6) but rather with reference to the distance model (6) that is expanded by the actuator model (14). The following dynamic limits may be designed for state constraints $$\gamma_{\ominus,k_-}(z, w_{p,k_-}) = w_{p,k_-} - (r_{k_-}^T + r_{p,k_-}^T) \cdot z, \quad (17a)$$

$$\gamma_{\oplus,k_+}(z, w_{p,k_+}) = w_{p,k_+} - (r_{k_+}^T + r_{p,k_+}^T) \cdot z \quad (17b)$$

In order to maintain the $k^{th}$ state constraint (11) a feedback control unit $$r_k = [0, \ldots, 0, r_k(\xi_k), \ldots, r_k(n)]^T. \quad (18)$$

is designed so as to stabilize the flat states $z_i$ with $i=\xi_k \ldots n$. In this case $\xi_k$ is the index i precisely of this state $z_i$ that occurs in the $k^{th}$ constraint and has a minimal relative degree.

$\xi$ may be calculated in accordance with $$\xi_k = \min_i r_i \quad (19)$$

under the condition $r_i = n+1-i$, $f_{z,k}(i) \neq 0$, $1 \leq i \leq n$,

Moreover, the following variables are produced $$w_{p,k} = \frac{r_k(\xi_k)}{f_{z,k}(\xi_k)} \cdot g_{z,k}, \quad (20)$$

$$r_{p,k} = r_k(\xi_k) \cdot \left[ \frac{f_{z,k}(1)}{f_{z,k}(\xi_k)}, \ldots, \frac{f_{z,k}(\xi_k - 1)}{f_{z,k}(\xi_k)}, 0, \ldots, 0 \right]^T. \quad (21)$$

in dependence upon the polytopic state constraint (11), for which the corresponding limit is designed.

Finally, the sign $(f_{z,k}(\xi_k)) \in \{-1, 1\}$ decides whether the $k^{th}$ state constraint is taken into consideration via an upper or lower limit (17).

For a detailed description reference is made to Joos, S.; Bitzer, M.; Karrelmeyer, R.; Graichen, K.: Prioritization-based switched feedback control for linear SISO systems with time-varying state and input constraints. Proc. European Control Conference, p. 2935-2940, 2018.

The invention renders it possible to plan a realizable trajectory that is close to (or rather at) the constraint. In accordance with the invention, compatible constraints are control variable and control rate constraints and also state constraints that may be formulated (at least approximately) as polytopic constraints of the flat state. The invention has real-time capability as a result of the continuous filter design and does not require any outlay with regard to numerical optimization. In accordance with the invention, it is possible via state constraints to form and maintain systematically safety limits. The invention renders it possible to influence how hard or soft the trajectory is planned into the state constraints. It is thus possible to avoid hard stops which depending upon the application may considerably reduce component wear (for example of valves). The trajectories that are planned using the invention produce (in the case of a sufficiently precise feedforward control procedure) realistic information regarding the prevailing system state as long as it is ensured that the controlled system is functioning in an error-free manner. This information may be used by way of example for (higher ranking) diagnostic functions.

What is claimed is:

1. A method for operating an actuator of a hydraulic system, the method comprising:
generating a control variable trajectory for the actuator by:
supplying a set point to a trajectory planning procedure;
generating from the supplied set point, a trajectory of constrained input values for a filter integrator chain and a trajectory of flat desired states using the trajectory planning procedure;
supplying the trajectory of constrained input values and the trajectory of flat desired states to a flatness-based feedforward control procedure; and
generating the control variable trajectory for the actuator from the trajectory of constrained input values and the trajectory of flat desired states with the flatness-based feedforward control procedure,
operating the actuator to influence an input variable of the hydraulic system based on the generated control variable trajectory,
wherein at least one constraint is applied to the set point in the trajectory planning procedure to generate the trajectory of constrained input values, and
wherein the least one constraint is dependent on the trajectory of flat desired states.

2. The method according to claim 1, wherein the at least one constraint includes a control variable constraint.

3. The method according to claim 1, wherein the at least one constraint includes a constraint that is dependent on a control range of the actuator.

4. The method according to claim 1, wherein the at least one constraint includes an output variable constraint.

5. The method according to claim 4, wherein:
the hydraulic system includes a hydraulic adjustment cylinder having a movable piston,
the hydraulic adjustment cylinder is operably connected to the actuator, and
the output variable constraint is a constraint on a position of the movable piston.

6. The method according to claim 1, wherein the actuator is an electrically controllable valve.

7. The method according to claim 6, wherein the at least one constraint includes a control variable constraint that is one of (i) a magnetic force constraint_ and (ii) a control current constraint to a value between a minimum value and a maximum value.

8. The method according to claim 6, wherein the at least one constraint includes a constraint of a valve spool position that is dependent on a control range of the actuator.

9. The method according to claim 1, wherein a computer is configured perform the method.

10. The method according to claim 9, wherein the computer executes a computer program that causes the computer to perform the method.

11. The method according to claim 1, wherein a non-transitory machine-readable storage medium is configured to store a computer program for causing a computer to perform the method, when the computer program is executed on the computer.

* * * * *